(12) United States Patent
Ouwerkerk

(10) Patent No.: US 7,944,667 B2
(45) Date of Patent: May 17, 2011

(54) THERMAL SECURITY FOR HYBRID VEHICLE RECHARGING CABLE PLUGS DEVICE AND METHOD

(75) Inventor: David B. Ouwerkerk, Torrance, CA (US)

(73) Assignee: GM Global Technology Operations LLC, Detroit, MI (US)

(*) Notice: Subject to any disclaimer, the term of this patent is extended or adjusted under 35 U.S.C. 154(b) by 394 days.

(21) Appl. No.: 12/141,703

(22) Filed: Jun. 18, 2008

(65) Prior Publication Data

US 2009/0316321 A1 Dec. 24, 2009

(51) Int. Cl.
*H02H 5/04* (2006.01)
(52) U.S. Cl. ...................................... 361/106
(58) Field of Classification Search .................. 361/106
See application file for complete search history.

(56) References Cited

U.S. PATENT DOCUMENTS

| | | | | |
|---|---|---|---|---|
| 2,499,663 A * | 3/1950 | Medlar | ............ | 320/150 |
| 3,132,223 A * | 5/1964 | Jacobs, Jr. | ............ | 337/251 |
| 3,331,013 A * | 7/1967 | Cunningham | ............ | 323/239 |
| 4,834,677 A * | 5/1989 | Archang | ............ | 439/660 |
| 5,541,803 A * | 7/1996 | Pope et al. | ............ | 361/103 |
| 5,590,010 A * | 12/1996 | Ceola et al. | ............ | 361/93.4 |
| 5,600,306 A * | 2/1997 | Ichikawa et al. | ............ | 340/584 |
| 5,661,623 A * | 8/1997 | McDonald et al. | ............ | 361/42 |
| 5,841,617 A * | 11/1998 | Watkins et al. | ............ | 361/106 |
| 6,292,337 B1 * | 9/2001 | Legatti et al. | ............ | 361/46 |
| 7,666,033 B1 * | 2/2010 | Fung | ............ | 439/620.26 |
| 2009/0311910 A1 * | 12/2009 | Kleinke | ............ | 439/607.51 |
| 2009/0316321 A1 * | 12/2009 | Ouwerkerk | ............ | 361/106 |

* cited by examiner

*Primary Examiner* — Ronald W Leja
(74) *Attorney, Agent, or Firm* — Ingrassia Fisher & Lorenz, P.C.

(57) ABSTRACT

A system is provided for interrupting current in an electrical cable having an end plug. The system comprises a sensor coupled to the plug and having an output indicative of the temperature of the plug, and a current interrupting device coupled to the sensor for interrupting current in the cable when the temperature reaches a predetermined temperature.

20 Claims, 5 Drawing Sheets

THERMAL SECURITY FOR HYBRID VEHICLE RECHARGING CABLE PLUGS DEVICE AND METHOD

TECHNICAL FIELD

The present invention generally relates to hybrid/electric vehicle applications, and more particularly relates to a system for detecting when a plug from a recharging system cable reaches a predetermined temperature and for interrupting the flow of current through the cable at such time.

BACKGROUND OF THE INVENTION

In recent years, advances in technology have led to substantial changes in the design of automobiles. Many of these changes involve the complexity and magnitude of power usage of various electrical systems within automobiles, and particularly those of hybrid and electric vehicles. These vehicles are typically designed to draw a significant amount of their power output from rechargeable batteries. To better accommodate consumers, manufacturers of such vehicles have made the process of recharging batteries easier and more convenient by designing recharging systems to be compatible with common 110/120V home/garage outlets. A driver may "refuel" a vehicle during periods of non-use such as overnight by simply plugging a recharger's specially constructed power cable into such an outlet. The system maintains the recharging rate at safe levels throughout the process, and automatically turns the power off when a full charge level is achieved.

Automotive power cables for home-based vehicular recharging are designed to handle relatively high current loads for extended periods of time. To provide added protection, manufacturers often include built-in safety features that generally comprise a circuit breaking device such as a ground fault circuit interrupter, or GFCI, located at or near the cable's plug. A GFCI prevents current leakage by automatically opening the circuit whenever a sufficient disparity between outgoing and returning current levels is detected. However, the plug end of a recharging power cable may still become loose fitting and/or bent over time, possibly degrading outlet-to-plug electrical contact and contributing to overheating. Further, recharging is often performed without supervision over a period of several hours and an overheated plug may not cause a current leakage and thus may go undetected by a GFCI.

Accordingly, it is desirable to provide a system for detecting the temperature of the plug on a vehicular battery recharging cable during a recharging cycle. Further, it is also desirable to halt the flow of current in the recharging cable when the plug temperature reaches a specified threshold level. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an embodiment, by way of example only, a system is provided for interrupting current in an electrical cable having an end plug. The system comprises a sensor coupled to the plug and having an output indicative of the temperature of the plug, and a current interrupting device coupled to the sensor for interrupting current in the cable when the temperature reaches a predetermined temperature.

A method for preventing a vehicular recharging cable plug attached to a cable from overheating during a recharging cycle in accordance with an exemplary embodiment of the present invention is provided. The method comprises generating a temperature-dependent signal in the plug indicative of the plug temperature, directing the signal to a current interrupting device coupled to the recharging cable, and interrupting the current flowing in the cable when the signal exceeds a predetermined level.

DESCRIPTION OF THE DRAWINGS

The present invention will hereinafter be described in conjunction with the following drawing figures, wherein like numerals denote like elements, and.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
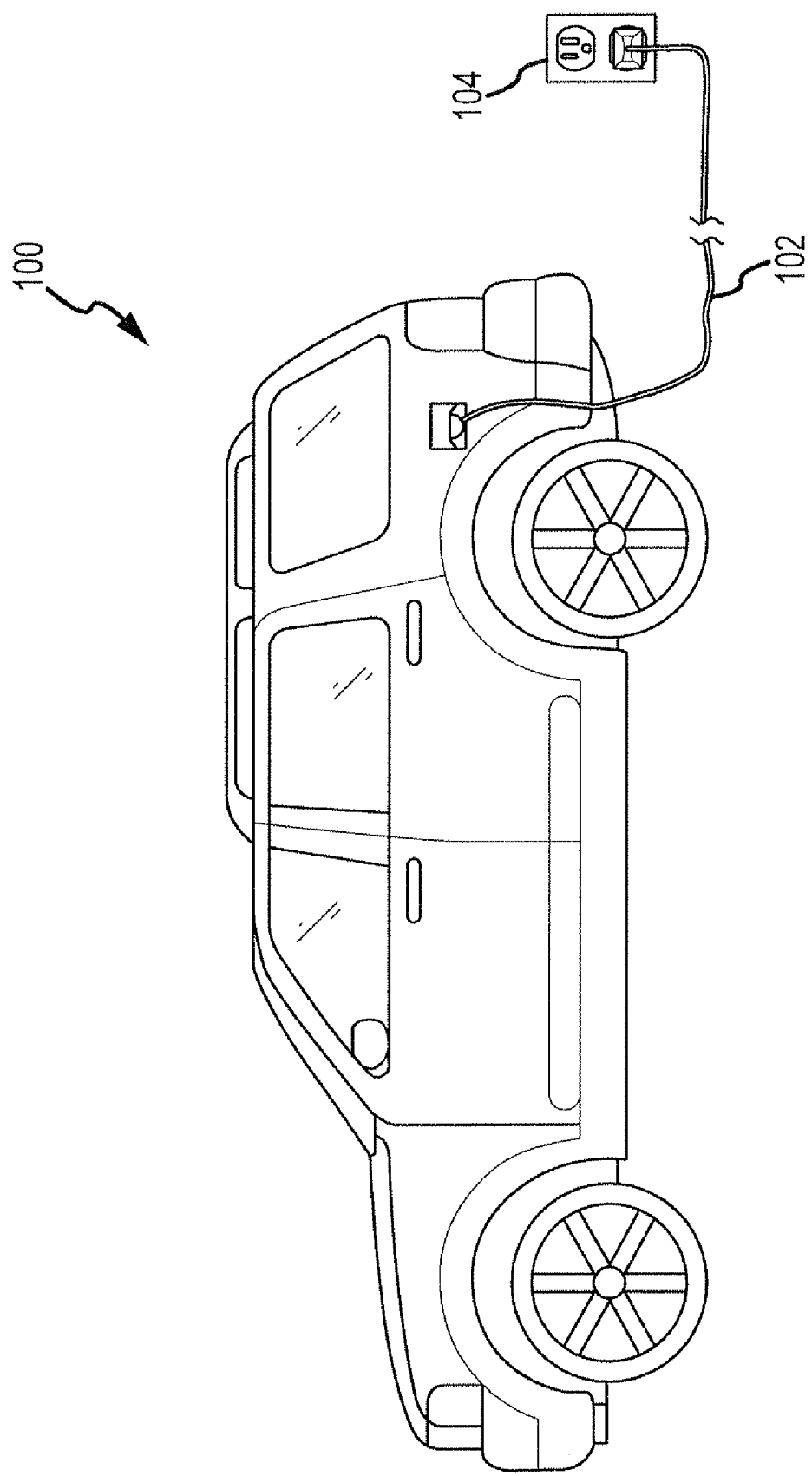
FIG. 1 illustrates a hybrid vehicle including a connector cable plugged into an external outlet.

FIG. 1 is an isometric view of a vehicle 100, such as a battery-powered electric vehicle or plug-in hybrid electric vehicle. Vehicle 100 is at least partially powered by an onboard battery assembly that may be recharged by connecting a recharging cable 102 to an external power source. For example, recharging cable 102 may include an end having multiple prongs configured to be plugged into a common electrical outlet socket 104, that is coupled to the national power grid (e.g., to one of the three main power grid interconnections extending across the 48 contiguous states). In accordance with the present invention, vehicle 100 is equipped with a vehicular charging system that may determine an optimal charge initialization time (CIT) and commence charging of vehicle 100 in accordance with the determined CIT.

Figure 2:
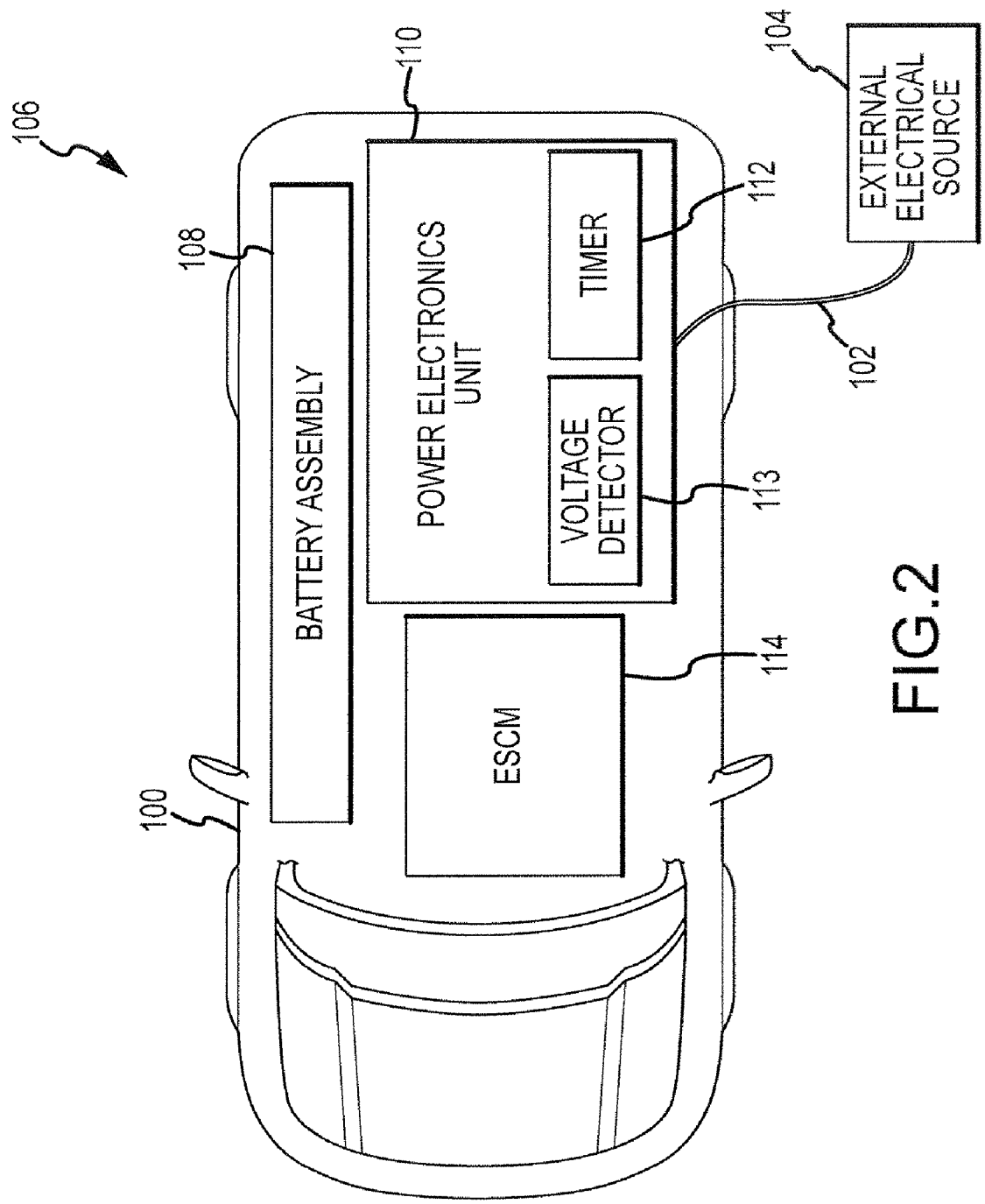
FIG. 2 is a functional block diagram of a vehicular charging system deployed on the vehicle shown in FIG. 1 in accordance with an exemplary embodiment of the present invention.

FIG. 2 is a functional view of an exemplary vehicular charging system 106 deployed on vehicle 100. Vehicular charging system 106 includes a hybrid battery assembly 108 comprising multiple batteries, at least one of which has a rechargeable chemistry (e.g., nickel metal hydride, lithium ion, etc.). A power electronics unit 110, which includes a timer 112 (e.g., a processor), is coupled between battery assembly 108 and recharger cable 102. Power electronics unit 110 may also include a voltage detector 113 for determining when recharging cable 102 is connected to an external electrical source, such as electrical outlet socket 104. Power electronics unit 110 may control the charging of battery assembly 108 by selectively coupling external electrical outlet socket 104 to battery assembly 108 through recharging cable 102. An energy storage control module (ESCM) 114 is also coupled to battery assembly 108 and power electronics unit 110. ESCM 114 monitors various operational parameters of battery assembly 108 (e.g., voltage, current, temperature, and/or charge level).

Figure 3:
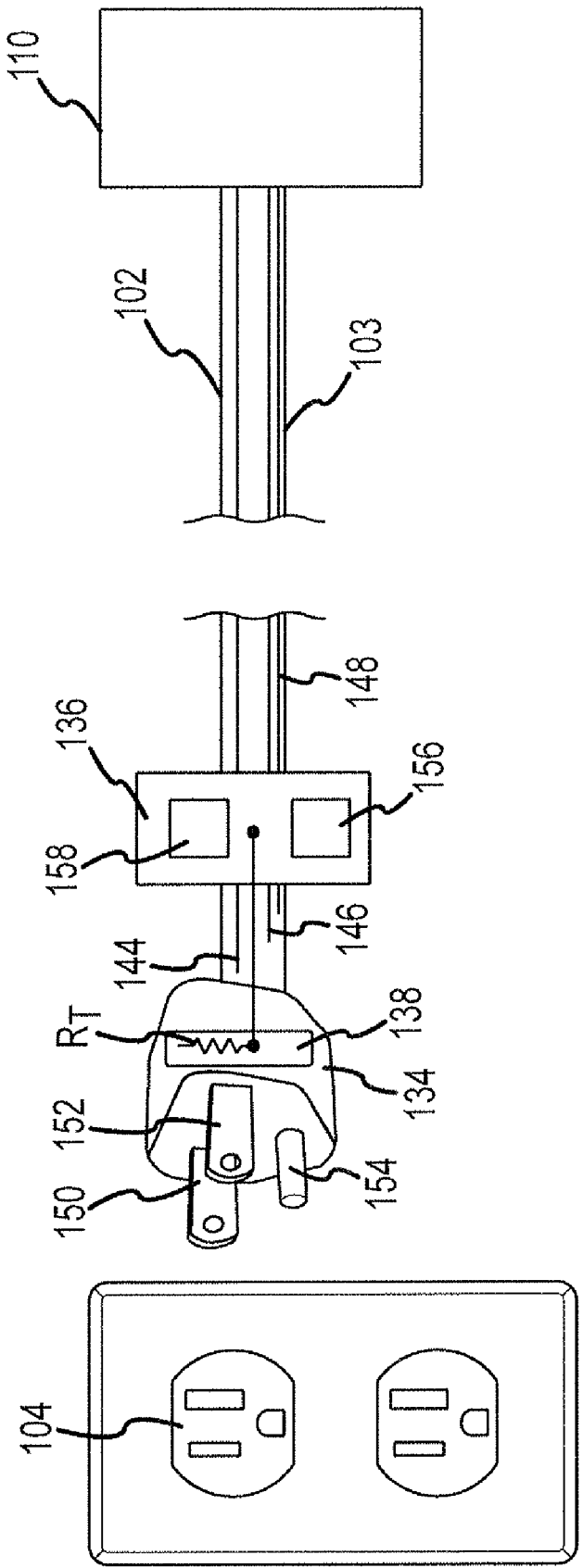
FIG. 3 is a schematic drawing illustrating a recharging cable and plug in accordance with an embodiment of the present invention.

FIG. 3 is a schematic drawing of a recharging cable 102 in accordance with a first exemplary embodiment. The cable 102 is comprised of three separate wires including a power wire 144, a neutral wire 146, and a ground wire 148. Each of the three wires is individually insulated with a non-conductive coating to prevent contact with a neighboring wire and/or other external conductor that may cause a short circuit thereby. The three individually insulated wires are encased by a single outer insulating layer 103 comprised of a suitable non-conductive material collectively forming the recharging cable 102 thereby. The insulation used for wires and cables may typically be composed of a durable, flexible, and non-conducting material such as an appropriate, typically thermoplastic, polymer.

A three-prong, male connector plug 134 is attached to an end of cable 102 and is used to connect it with an external, typically AC, power source accessed via a female electrical outlet socket 104. Power 144, neutral 146, and ground 148 wires are each connected to a separate prong 150, 152, and 154 respectively of plug 134 that may be configured in accordance with a standard design such as NEMA 5 (National Electrical Manufacturers Association) for a 3-wire device with a ground. The plug 134 may be significantly larger in cross-sectional area than cable 102 and contoured to facilitate handling by a user. Plug 134 typically comprises a non-conducting material to maintain electrical isolation of internal conductive elements (wires and prongs), and may be thermally insulating to protect a user from exposure to heating that may occur during a recharging cycle.

Protection from defects in recharging circuits may be achieved using a built-in current interrupting device (CID) such as a circuit breaker or a GFCI. Referring to FIG. 3, in an exemplary embodiment, CID 136 comprises a solenoid 156 coupled to a temperature sensor 138 embedded within plug 134 to provide thermal protection thereto. Sensor 138 comprises a temperature sensitive element $R_T$, such as a thermal resistor (thermister), or a resistance temperature detector, that changes resistance as a function of temperature. In a further embodiment, $R_T$ comprises an element such as a thermocouple that produces a voltage that changes as a function of its temperature. $R_T$ is embedded within plug 134 proximate to prongs 150, 152, and 154, and thereby changes temperature with these surroundings. Sensor 138 is configured to detect when the temperature of plug 134 exceeds a predetermined threshold temperature, and generate an output signal indicative of the temperature. Solenoid 156 is configured to receive the output signal and be triggered thereby to open the circuit and interrupt current in cable 102 when the temperature exceeds the predetermined temperature. In a further embodiment, CID 136 comprises GFCI 158, and solenoid 156 is of the type typically incorporated into a GFCI. When the sensor 138 generates an output signal indicative of a temperature that exceeds the predetermined temperature, solenoid 156 is triggered to open the circuit and interrupt current flowing in cable 102. In yet a further exemplary embodiment, CID 136 may be located a short distance from the plug 134 (e.g. about 2 to about 24 inches), or in a further embodiment, sensor 138 and CID 136 may be formed integrally with, and encased by, plug 134.

The predetermined threshold temperature may depend on many factors including the physical properties of the polymeric materials used to construct plug 134. Accordingly, the threshold temperature may typically be set below the heat-distortion temperature (or heat deflection temperature) of the least thermally stable material used to prevent deformation from excessive softening. Further, it may be desirable to maintain the plug surface at a temperature comfortable to a user. Accordingly, design features of plug 134 including but not limited to shape, size, materials used, and the distance from the surface to internal heat generating components (wires and prongs) will influence the allowable threshold temperature. In one exemplary embodiment, plug 134 is a thermoplastic material suitable for the type of injection molding processes used to fabricate electrical plugs. In a further embodiment, plug 134 is constructed of Ryton® [Poly (p-phenylene sulphide)]; a thermally stable, solvent resistant, and highly flame resistant thermoplastic material. In yet a further embodiment, the maximum predetermined threshold temperature of the interior of plug 134 is in a range of about from 80° C. to 150° C., and preferably is about 100° C.

Figure 4:
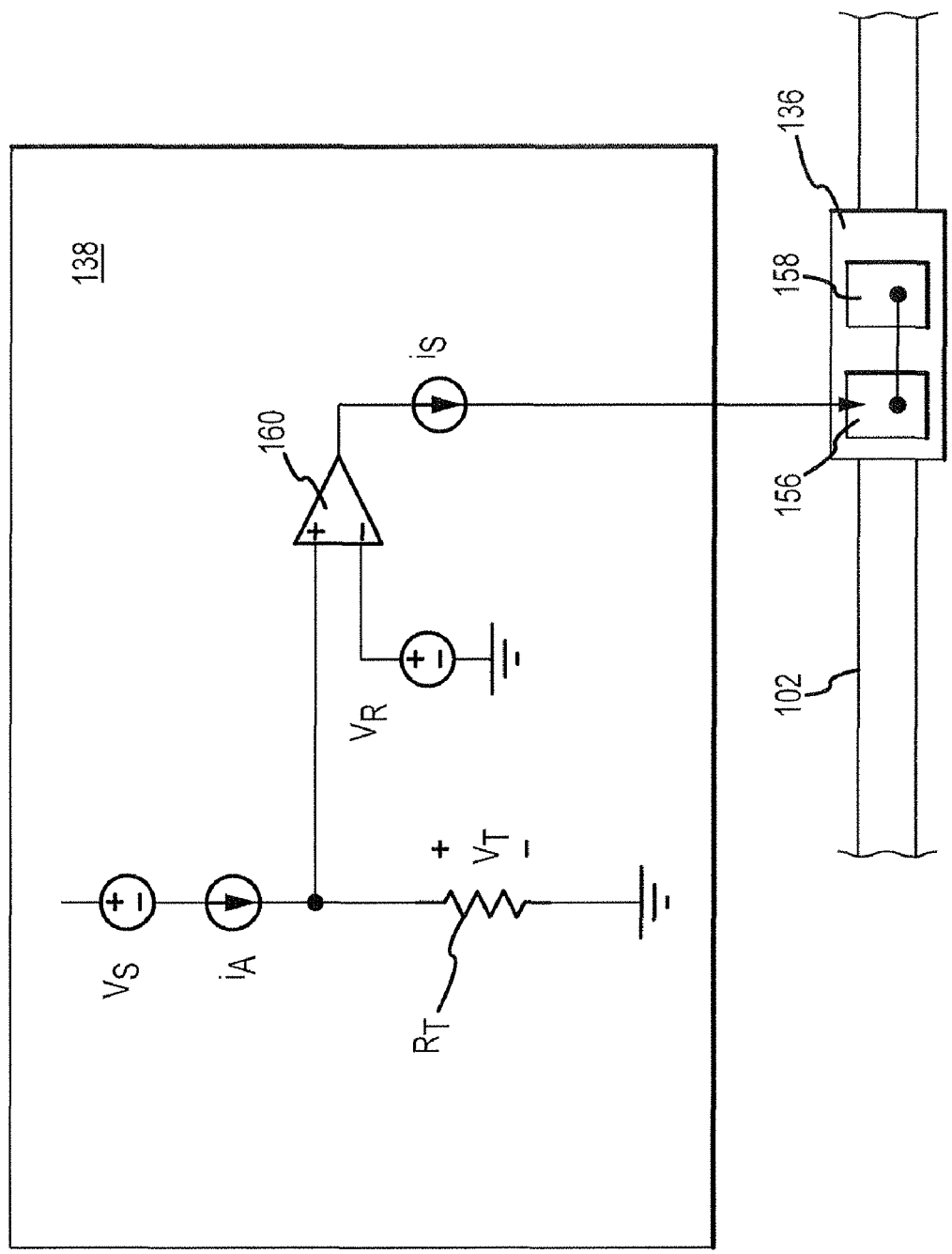
FIG. 4 is a schematic drawing of an exemplary electronic device suitable for use in conjunction with an embodiment of the present invention.

FIG. 4 illustrates a circuit suitable for use as sensor 138 in accordance with an exemplary embodiment. Sensor 138 comprises an operational amplifier 160 having a first input coupled to a constant voltage source $V_R$, a second input coupled to receive a voltage $V_T$, and an output that provides a signal $i_S$. Thermal resistor $R_T$ is embedded in plug 134 (FIG. 3) as previously described and changes resistance as a function of its temperature. Constant current from source $i_A$ provides an output voltage $V_T$ depending on the resistance of thermal resistor $R_T$. When $R_T$ reaches a threshold resistance indicative of a predetermined threshold temperature sensed within plug 134, the voltage $V_T$ becomes sufficient to cause operational amplifier 160 to generate an output signal $i_S$. In one exemplary embodiment, output signal $i_S$ is directed to solenoid 156, which is configured to be opened thereby, thus interrupting current flowing in cable 102 when the temperature of plug 134 reaches the predetermined temperature.

Figure 5:
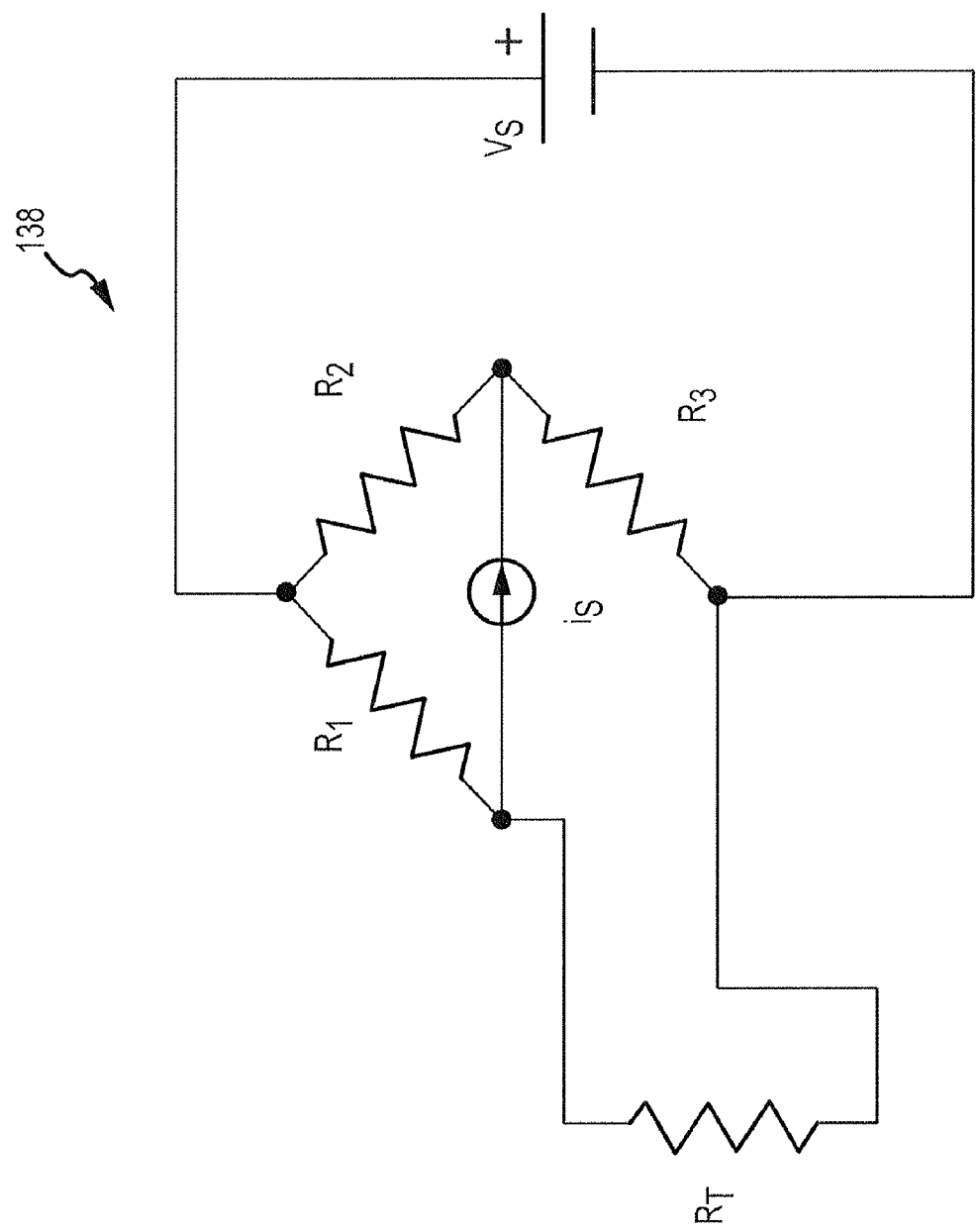
FIG. 5 is a schematic drawing of an exemplary Wheatstone Bridge circuit suitable for use in conjunction with an embodiment of the present invention.

Sensor 138 may assume other configurations such as a Wheatstone Bridge circuit schematically illustrated in FIG. 5. This circuit comprises resistances $R_1$, $R_2$, $R_3$, and $R_T$ coupled together as shown to a voltage source $V_S$. The output signal, $i_S$, varies in a well-known manner depending upon the values of the four resistors. The resistance magnitudes of $R_1$, $R_2$, and $R_3$ are configured to be invariant with temperature while $R_T$, embedded in plug 134, is configured to have a resistance that varies with temperature in a known manner. Accordingly, output signal $i_S$ is indicative of the temperature of plug 134, and may be used to open a solenoid 156 (FIG. 4) in a manner previously described when the temperature of plug 134 reaches the predetermined temperature.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for interrupting current in an electrical cable having an end plug, the system comprising:

a sensor coupled to the plug and having an output indicative of the temperature of the plug; and a current interrupting device coupled to the sensor for interrupting current in the cable when the temperature reaches a predetermined temperature, wherein the predetermined temperature is in a range of about from 80° C. to 150° C.

2. A system according to claim 1, wherein the sensor is formed integrally with the plug.

3. A system according to claim 1, wherein the current interrupting device is formed integrally with the plug.

4. A system according to claim 1, wherein the current interrupting device and the plug are configured to be in a range of about from 2 inches to 24 inches apart.

5. A system according to claim 1, wherein the sensor comprises a thermocouple.

6. A system according to claim 1, wherein the sensor comprises a Wheatstone Bridge circuit.

7. A system according to claim 1, wherein the sensor comprises a thermister or a resistance temperature detector.

8. A system according to claim 1, wherein the plug comprises a thermoplastic polymer.

9. A system according to claim 8, wherein the thermoplastic polymer comprises Ryton®.

10. A system according to claim 1, wherein the current interrupting device comprises a solenoid.

11. A system according to claim 1, wherein the current interrupting device further comprises a ground fault circuit interrupter coupled to the solenoid.

12. A system according to claim 1, wherein the sensor further comprises:

a temperature sensing circuit embedded within the cable; and an operational amplifier having a first input coupled to a constant voltage source and a second input coupled to an output of the temperature sensing circuit, wherein when the temperature reaches a predetermined temperature, the output of the temperature sensing circuit causes the operational amplifier to output a signal causing the current interrupting device to interrupt the current in the cable.

13. A system for interrupting current in a vehicular recharging cable having a plug, the system comprising:

a temperature sensitive device encased in the plug and having an output indicative of the temperature of the plug; and a current interrupting device coupled to the temperature sensing device for receiving the output and interrupting current in the vehicular recharging cable when the temperature reaches a predetermined temperature, wherein the predetermined temperature is in a range of about from 80° C. to 150° C.

14. A system according to claim 13, wherein the current interrupting device is integrated into the plug.

15. A system according to claim 13, wherein the current interrupting device comprises a solenoid.

16. A system according to claim 13, wherein the current interrupting device further comprises a ground fault circuit interrupter coupled to the solenoid.

17. A method for preventing a vehicular recharging cable plug attached to a cable from overheating during a recharging cycle, comprising the steps of:

generating a temperature-dependent signal in the plug indicative of the plug temperature;

directing the signal to a current interrupting device coupled to the recharging cable; and interrupting the current flowing in the cable when the signal exceeds a predetermined temperature, wherein the predetermined temperature is in a range of about from 80° C. to 150° C.

18. The method of claim 17, wherein the step of interrupting further comprises interrupting the current when the temperature of the plug reaches a predetermined temperature that is less than the heat-distortion temperature of the plug.

19. The method of claim 17, wherein the step of interrupting further comprises interrupting the current when the temperature of the plug reaches a predetermined temperature that is about 100° C.

20. The method of claim 17, further comprising encasing a temperature sensor and the current interrupting device into the plug.

* * * * *